UNITED STATES PATENT OFFICE.

GEORGE O. SEWARD AND FRANZ VON KÜGELGEN, OF HOLCOMBS ROCK, VIRGINIA.

PRODUCTION OF ALKALI METALS.

No. 841,724.     Specification of Letters Patent.     Patented Jan. 22, 1907.

Application filed April 23, 1906. Serial No. 313,130.

*To all whom it may concern:*

Be it known that we, GEORGE O. SEWARD, a citizen of the United States, and FRANZ VON KÜGELGEN, a subject of the German Emperor, both residing at Holcombs Rock, in the county of Bedford and State of Virginia, have jointly invented certain new and useful Improvements in the Production of Alkali Metals, of which the following is a specification.

In the production by electrolysis of the alkali metals from their chlorids it is necessary to employ an electrolyte of low melting-point, for the reason that the output of metal decreases as the temperature of the electrolyte increases, until at certain temperatures almost no metal is separated. If the temperature of the electrolyte is kept low enough, however, it is possible to obtain excellent results and high efficiencies. This fact has been generally recognized by those skilled in the art, and various electrolytes have been proposed.

For the production of sodium a mixture of NaCl and NaF has been proposed, also a mixture of NaCl and KCl; but these have the disadvantage of not melting at as low a temperature as is desirable to give the best results. Other electrolytes proposed are a mixture of NaCl, KCl, and an earth-alkali chlorid; also, a mixture of NaCl, KCl, and NaF, the two latter reacting to form KF, so that the mixture is essentially one of NaCl and KF. Both of these electrolytes have very low melting-points; but the presence of a potassium salt is undesirable, as there is a tendency of a part of the potassium salt to be decomposed with the sodium salt, so that the sodium produced is contaminated with potassium.

The present invention provides an electrolyte which does not possess any of the disadvantages of electrolytes previously used in the manufacture of alkali metals and which possesses the desirable features of the best of them.

It consists in the combination of the chlorid of the alkali metal sought, a fluorid of the same metal, and a chlorid of an earth-alkali metal.

As an example of our invention for the production of sodium we use a mixture of NaCl, NaF, and $BaCl_2$. This electrolyte remains fluid below a red heat. For the production of potassium we use a mixture of KCl, KF, and an earth-alkaline chlorid, such as $BaCl_2$. Besides the low melting-points of these electrolytes the great advantage is that there is no danger of contaminating the alkali metal sought by another alkali metal, since the earth-alkali salt is not decomposed at the current density used in the production of the alkali metal.

Our invention is not limited to the use of a single earth-alkali salt with the alkali salts, it being of no disadvantage to use two or more earth-alkali salts, if desired.

For the production of metallic sodium we use as an electrolyte four parts NaCl, two parts NaF, one part $BaCl_2$ and subject the fused mixture to electrolysis in a suitable apparatus, where the separated metal is kept apart from the halogen and protected from the action of the air. Only sodium chlorid, with a very small proportion of sodium fluorid, is decomposed. From time to time sodium chlorid is fed in to replace that decomposed, and at longer intervals a small amount of sodium fluorid is also fed in to keep the proportion of that salt substantially constant.

It will be understood that the above-mentioned proportions of ingredients of a sodium electrolyte may be considerably varied without departure from the invention and without particular disadvantage, although the proportions stated are those which our present experience indicates as giving the best results.

Similar proportions of the corresponding salts are suitable for a potassium electrolyte.

We claim as our invention—

1. The production of an alkali metal by the electrolysis of the chlorid of the alkali metal sought, with the addition of fluorid of the same metal and chlorid of an earth-alkali metal.

2. The production of sodium by the electrolysis of a fused mixture of sodium chlorid, sodium fluorid, and a chlorid of an earth-alkali metal, substantially as described.

In witness whereof we have hereunto signed our names in the presence of two subscribing witnesses.

GEORGE O. SEWARD.
    FRANZ VON KÜGELGEN.

Witnesses:
    J. H. WEBB,
    P. O. HARDING.